(12) United States Patent
Jestings

(10) Patent No.: US 12,150,596 B1
(45) Date of Patent: Nov. 26, 2024

(54) APPLIANCE KITCHEN CADDY WITH 360-DEGREE WHEELS

(71) Applicant: Wendy Jestings, Bradenton, FL (US)

(72) Inventor: Wendy Jestings, Bradenton, FL (US)

(*) Notice: Subject to any disclaimer, the term of this patent is extended or adjusted under 35 U.S.C. 154(b) by 0 days.

(21) Appl. No.: 18/678,544

(22) Filed: May 30, 2024

Related U.S. Application Data

(63) Continuation-in-part of application No. 18/505,536, filed on Nov. 9, 2023.

(51) Int. Cl.
*A47J 47/16* (2006.01)
*B62B 3/10* (2006.01)

(52) U.S. Cl.
CPC ..................... *A47J 47/16* (2013.01)

(58) Field of Classification Search
CPC .......... A47J 47/16; B62B 3/10; B62B 5/0485; B62B 5/06; B62B 2202/80; B62B 2301/05; B62B 2301/252
USPC ....................... 248/127; 280/47.34
See application file for complete search history.

(56) References Cited

U.S. PATENT DOCUMENTS

| | | | | |
|---|---|---|---|---|
| 2,986,767 A * | 6/1961 | Rice | B60B 33/0002 16/21 |
| 3,479,680 A * | 11/1969 | Kramcsak, Jr. | C23F 1/12 16/21 |
| 5,542,346 A * | 8/1996 | Shenk | A47J 37/0871 99/446 |
| 5,737,801 A * | 4/1998 | Flood | B60B 33/0002 248/223.41 |
| 5,745,951 A * | 5/1998 | Waner | B60B 33/021 16/31 R |
| 6,240,830 B1 * | 6/2001 | Goldston | A47J 31/44 99/290 |
| 6,410,068 B2 * | 6/2002 | Goldston | F16M 11/22 426/594 |
| 7,128,494 B2 * | 10/2006 | Lucht | B60B 33/001 248/188.7 |
| 8,418,315 B1 * | 4/2013 | Lin | B60B 33/0092 188/29 |
| 8,641,060 B2 * | 2/2014 | Starr | A47J 47/16 280/79.5 |
| 8,733,714 B1 * | 5/2014 | Reitmann | A47J 45/10 248/346.11 |
| 8,910,955 B1 * | 12/2014 | Buttazzoni | B62B 3/00 280/79.11 |
| 9,192,266 B2 * | 11/2015 | Starr | F16M 11/42 |
| 9,653,934 B2 * | 5/2017 | Forristall | H04M 1/04 |
| 10,051,957 B2 * | 8/2018 | Lipper McCauley | B60B 33/066 |
| 10,377,175 B2 * | 8/2019 | Franzone, Jr. | B60B 33/0002 |
| 11,083,339 B1 * | 8/2021 | Hertaus | A47J 31/4403 |
| 11,457,767 B1 * | 10/2022 | Hertaus | F16M 11/22 |
| 2010/0107360 A1 * | 5/2010 | Shih | B60B 1/006 16/21 |
| 2010/0247281 A1 * | 9/2010 | Kempf | B60B 33/0015 16/45 |
| 2014/0183322 A1 * | 7/2014 | Starr | A47J 47/16 248/129 |

(Continued)

*Primary Examiner* — Nkeisha Smith
(74) *Attorney, Agent, or Firm* — Dunlap Bennett & Ludwig, PLLC

(57) ABSTRACT

A kitchen caddy having an omnidirectional wheel system is provided. The omnidirectional wheel system enables unrestricted rotation and movement along a supporting surface. The kitchen caddy also provides a movement stabilizer operatively associated with the underside to, if desired, reduce mobility.

6 Claims, 7 Drawing Sheets

(56) References Cited

U.S. PATENT DOCUMENTS

2022/0305372 A1* 9/2022 Stephenson .......... A47B 23/001

* cited by examiner

APPLIANCE KITCHEN CADDY WITH 360-DEGREE WHEELS

CROSS-REFERENCE TO RELATED APPLICATION

This application claims the benefit of priority of U.S. non-provisional application Ser. No. 18/505,536, filed Nov. 9, 2023, the contents of which are herein incorporated by reference.

BACKGROUND OF THE INVENTION

The present invention relates to movable kitchen storage units and, more particularly, to a kitchen caddy with 360-degree, omnidirectional wheels.

Movable kitchen storage units or "caddies" that portably support kitchen equipment, cooking wares, and the like for use in and around a kitchen are known in the art. Such a 'kitchen caddy' is typically used for kitchen appliances that sit on top of a countertop, such as toasters, air fryers, Instant Pot™, coffee pots and coffee machines, Kitchen Aid™ mixer. The kitchen caddy usually sits on top of a kitchen counter, to pull out appliances that sit under the upper kitchen cabinets to be able to access them with ease. Of course, the kitchen caddy can be moved to more confined spaces, such as cabinets and cupboards.

One disadvantages for current kitchen caddies is that when used on the constricted space of a countertop or within a small, confined space such as a kitchen cabinet, cupboard or the like, the movability of kitchen caddy can be frustrated because other kitchen equipment or dishes on the same supporting surface present themselves as obstacles that need to be removed prior to moving the kitchen caddy or accessing the kitchen equipment it supports. Specifically, the problem with current kitchen caddies is that they are designed to only move front and back and do not allow omnidirectional movement or even side-to-side motion to angle around obstacles.

As can be seen, there is a need for a kitchen caddy with 360-degree wheel functionality enabling users to slide and glide their supported kitchen appliance out to get access to all its sides.

SUMMARY OF THE INVENTION

The present invention embodies a kitchen appliance caddy providing 360-degree, omnidirectional wheels for easy access appliances and kitchen devices being supported by the kitchen caddy, especially in cluttered spaces such as under kitchen cabinets or along a countertop.

The present invention provides an undriven wheel or caster system enabling 360-degree pivoting or rotation or omnidirectional wheels, thereby enabling gliding and sliding in any direction and rotation to any angle along its support surface.

The present invention may have a base on which the omnidirectional wheel system is supported, and the base may be a board made of wood or bamboo.

In one aspect of the present invention, a kitchen caddy includes a base having an operative surface and an opposing underside; and a plurality of omnidirectional wheels connected to the underside so that the base is slidable in any direction along a supporting surface for the plurality of omnidirectional wheels.

In another aspect of the present invention, the kitchen caddy further includes wherein the base has a thickness of less than three and a quarter centimeters so as to support a kitchen equipment within a confined kitchen space, wherein each omnidirectional wheel is a spherical ball mounted inside a restraining fixture; further including voids in the underside for embedding portion of each restraining fixture, wherein the spherical ball is supported by smaller ball bearings housing in the restraining fixture; further including a movement stabilizer operatively associated with the underside; further comprising a finger grip slot formed in the operative surface; and further including a finger grip insert embedded in the finger grip slot.

These and other features, aspects and advantages of the present invention will become better understood with reference to the following drawings, description and claims.

DETAILED DESCRIPTION OF THE INVENTION

Figure 1:
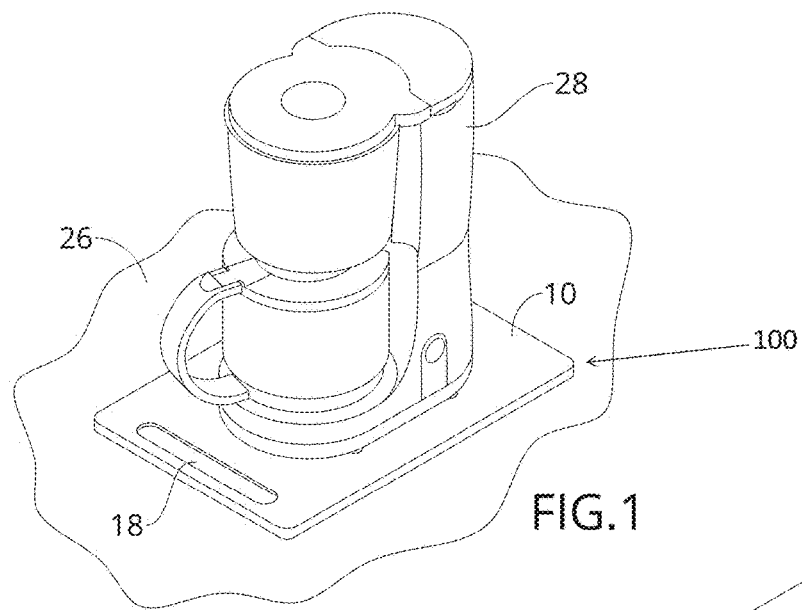
FIG. 1 is a perspective view of an exemplary embodiment of the present invention, shown in use.
Figure 2:
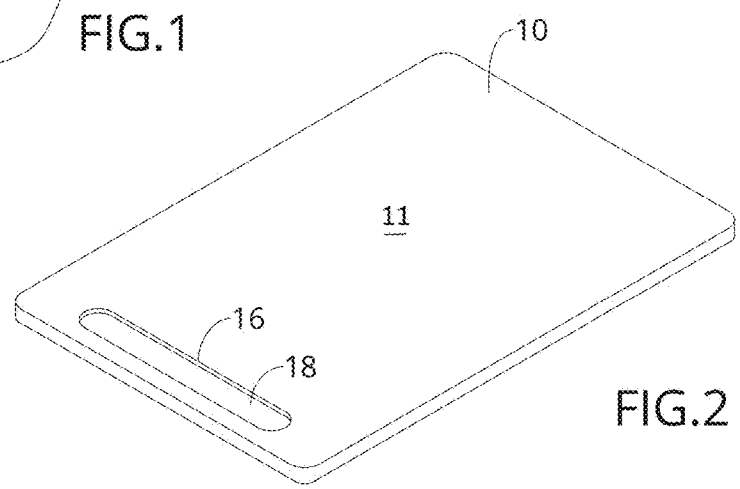
FIG. 2 is a top perspective view of an exemplary embodiment of the present invention.
Figure 3:
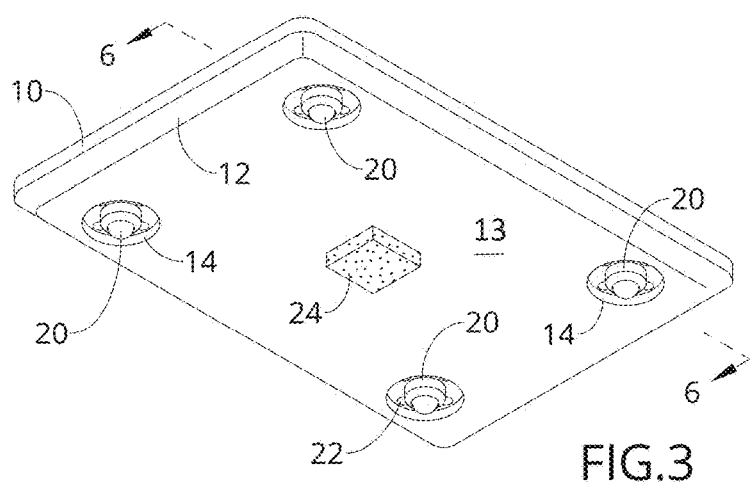
FIG. 3 is a bottom perspective view of an exemplary embodiment of the present invention.
Figure 4:
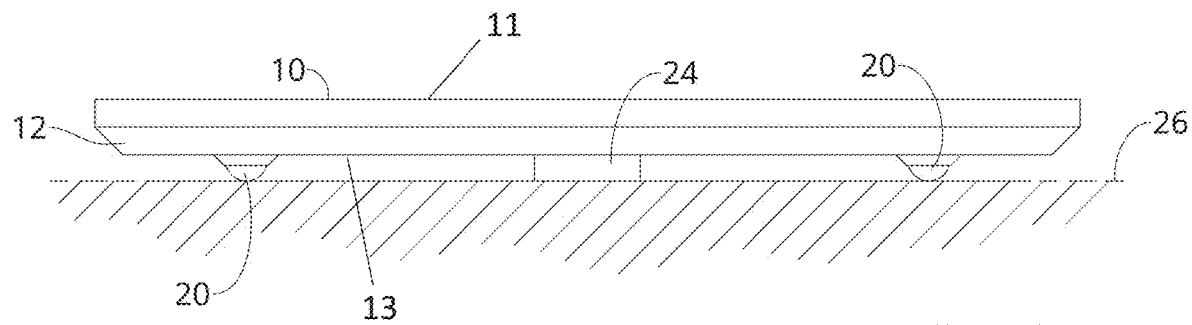
FIG. 4 is a side elevation view of an exemplary embodiment of the present invention.
Figure 5:
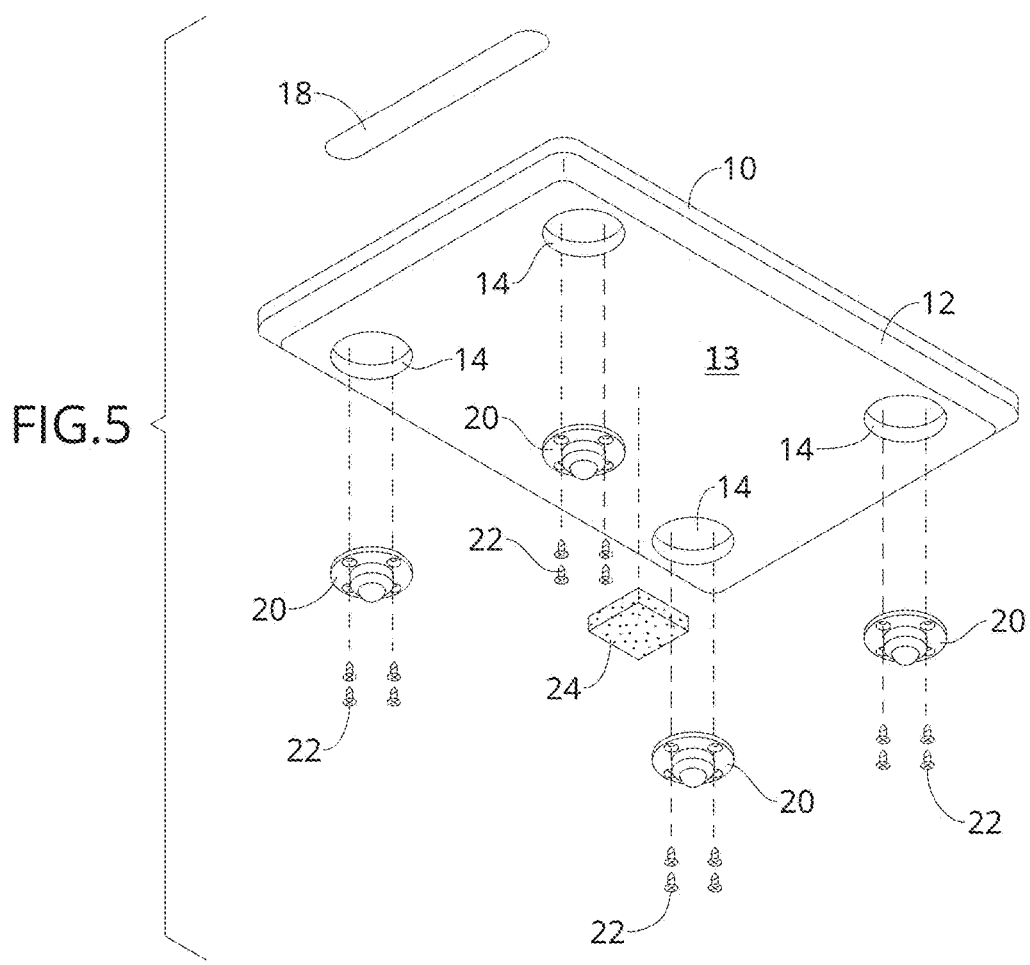
FIG. 5 is an exploded bottom perspective view of an exemplary embodiment of the present invention.
Figure 6:
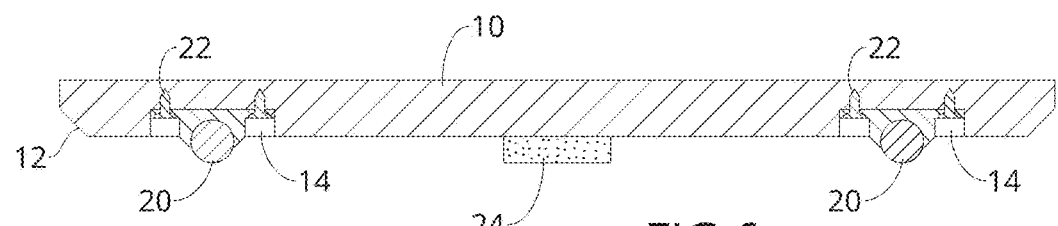
FIG. 6 is a section view of an exemplary embodiment of the present invention, taken along line 6-6 in FIG. 3.
Figure 7:
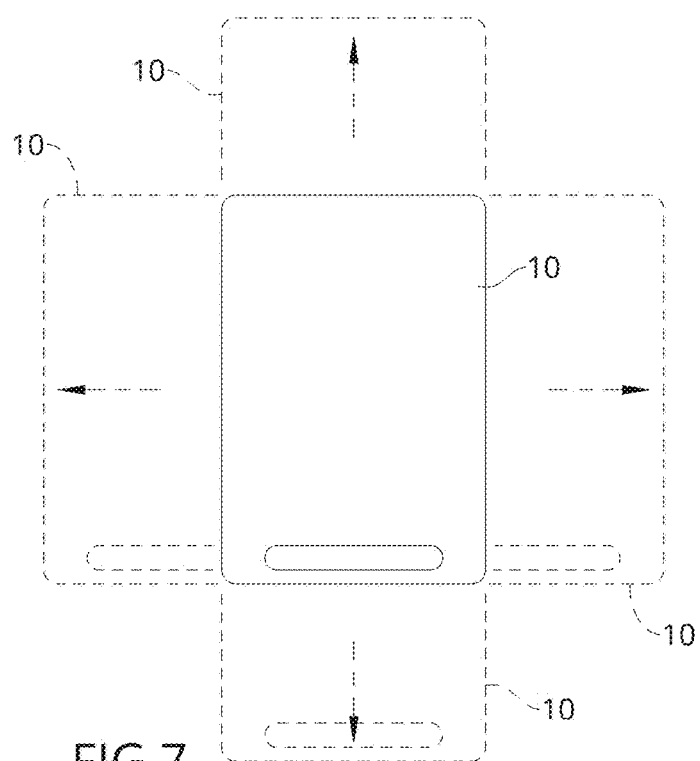
FIG. 7 is a top plan view of an exemplary embodiment of the present invention, illustrating some of the omnidirectional movement thereof.
Figure 8:
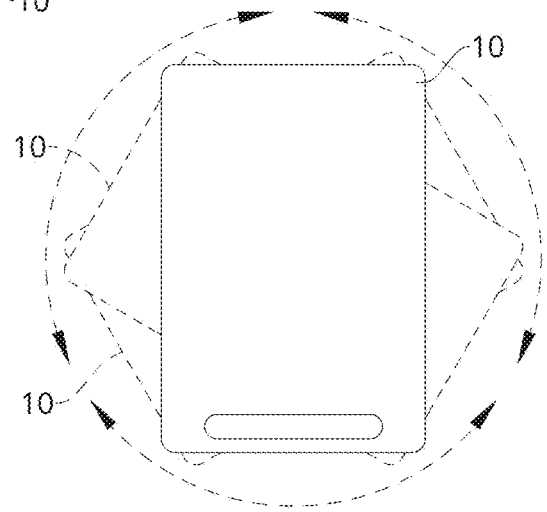
FIG. 8 is a top plan view of an exemplary embodiment of the present invention, illustrating the omnidirectional rotatability.
Figure 9:
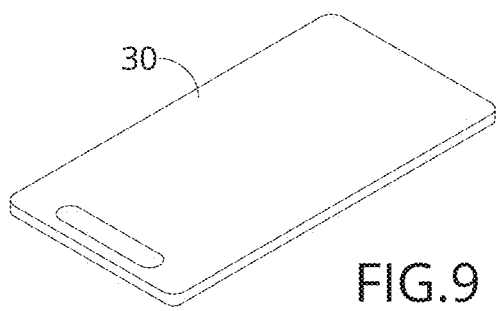
FIG. 9 is a top perspective view of an exemplary embodiment of the present invention.
Figure 10:
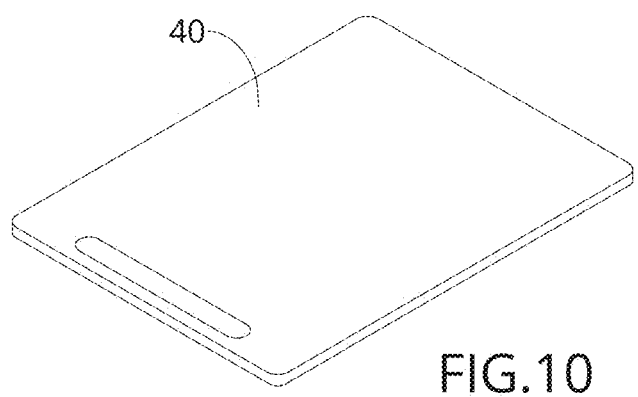
FIG. 10 is a top perspective view of an exemplary embodiment of the present invention.
Figure 11:
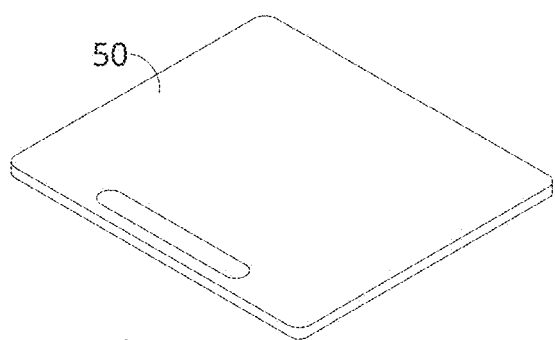
FIG. 11 is a top perspective view of an exemplary embodiment of the present invention.
Figure 12:
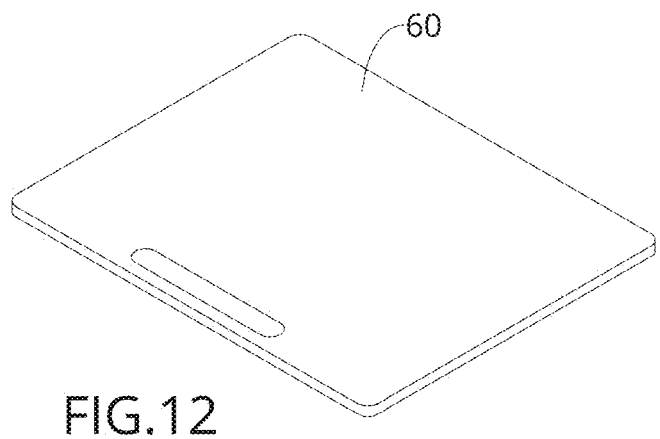
FIG. 12 is a top perspective view of an exemplary embodiment of the present invention.
Figure 13:
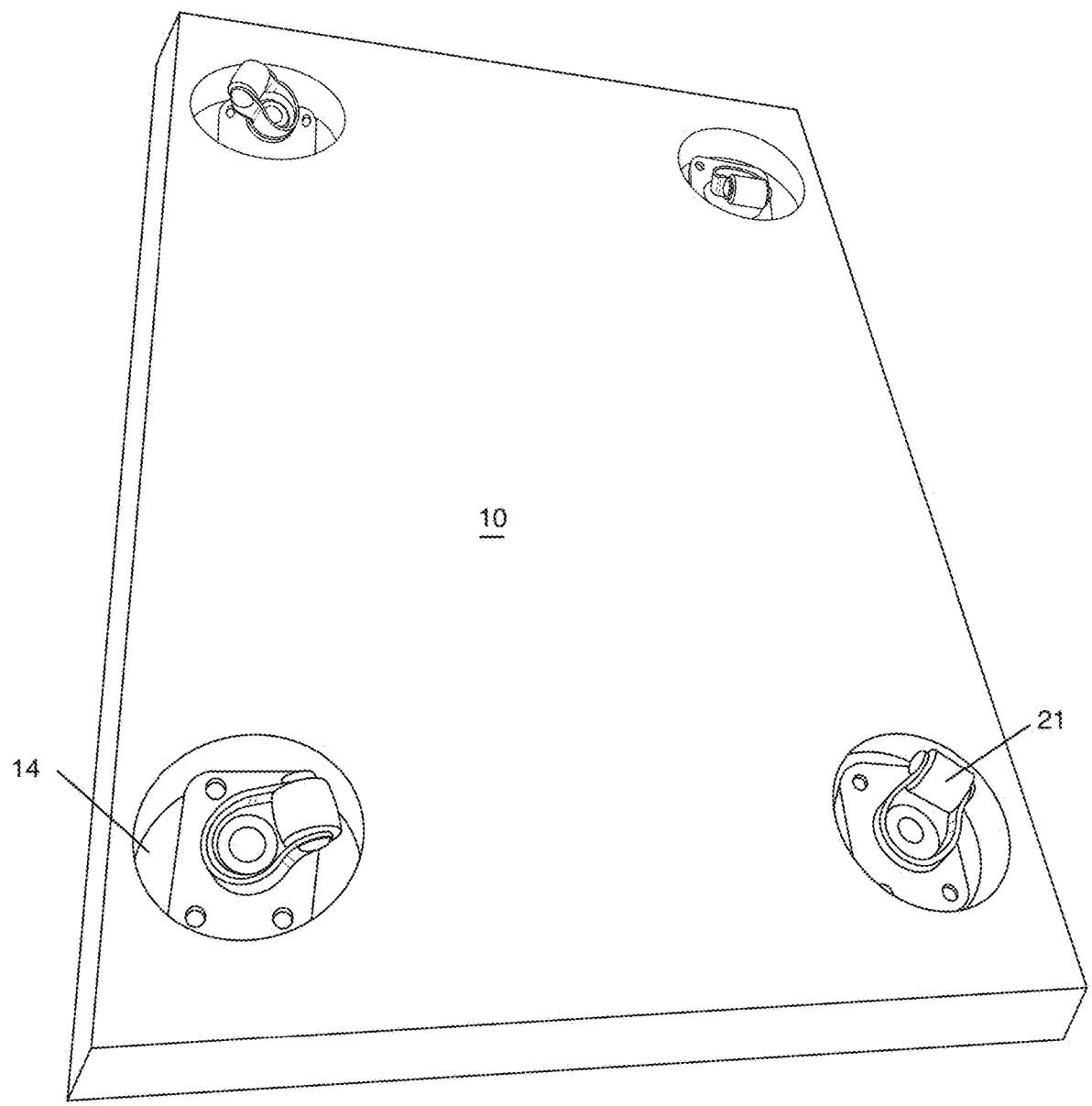
FIG. 13 is a bottom perspective view of an exemplary embodiment of the planar base 10 of the present invention present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a kitchen caddy having an omnidirectional wheel system to enable unrestricted rotation and movement along a supporting surface. The kitchen caddy also provides a movement stabilizer 24 which may be a peel and stick, 1.5-inch by 1.5-inch square, having an approximately one-inch width or thickness. The movement stabilizer 24 may be made of foam that reduces the free motion, if placed along the underside 13. The movement stabilizer 24 may be an approximate 1.5-inch foam square that helps to reduce sudden movements from say putting your coffee pot back onto pot the coffee machine. However, because it is foam, you can still push and move the entire caddy 360 degrees when you want it to move. The foam does not prevent movement, it just helps to create some stability acting as a movement reducer. It prevents slight movements when you are not actively trying to slide it in and out.

Referring to FIGS. 1 through 12, the present invention provides a kitchen caddy 100 having a planar base 10 (or board) having an operative surface 11 and an opposing underside 13. The base 10 may be made of various materials or substances, including but not limited to hardwood, softwood, grass-species wood (e.g., bamboo). The base 10 may be approximately two centimeters (cm) thick. The overall thickness, shape, and dimensions of base 10 may be different for different embodiments 30, 40, 50, and 60, as illustrated in FIGS. 9-12, while still enabling all the functionality of the disclosure herein.

The transition from the operative surface 11 and the opposing underside 13 may include a chamfered edge 12. The chamfered edge 12 may be rounded and lead to the flat surfaces of the operative surface 11 and the underside 13. The chamfered edge 12 may also include a sharp angle from its approximate midpoint or inflection point of the rounded sides to the underside 13.

The base 10 may provide any type of ergonomically feasible finger grip slot 16. The finger grip slot 16 may house a finger grip insert 18 adapted to increase manipulation of the base 10. The finger grip slot 16 may be approximately five cm deep. The finger grip insert 18 may be made of stainless steel or other sufficient material.

The base 10 may provide a connection point 14 just inward of the corners of the base 10 (and with embodiments where the operative surface 11 or the base 10 does not have four corners, the connection points 14 may be spaced apart and located so as to facilitate the most stable movement of the base 10 when moved along a supporting surface 26 by way of the omnidirectional wheel 20, which are disclosed more in detail herein). The connection points 14 may be voids or cutouts of the base 10 for nesting or embedding a portion of an omnidirectional wheel 20; in other embodiments, the connection points 14 may be locations along the underside 13 to which omnidirectional wheel 20 may be connected or joined thereto (say through adhesives or fasteners 22).

Each omnidirectional wheel 20 may be 360-degree ball casters or spherical wheel that is generally a spherical ball mounted inside a restraining fixture, wherein the spherical ball is supported by smaller ball bearings.

Figure 14:
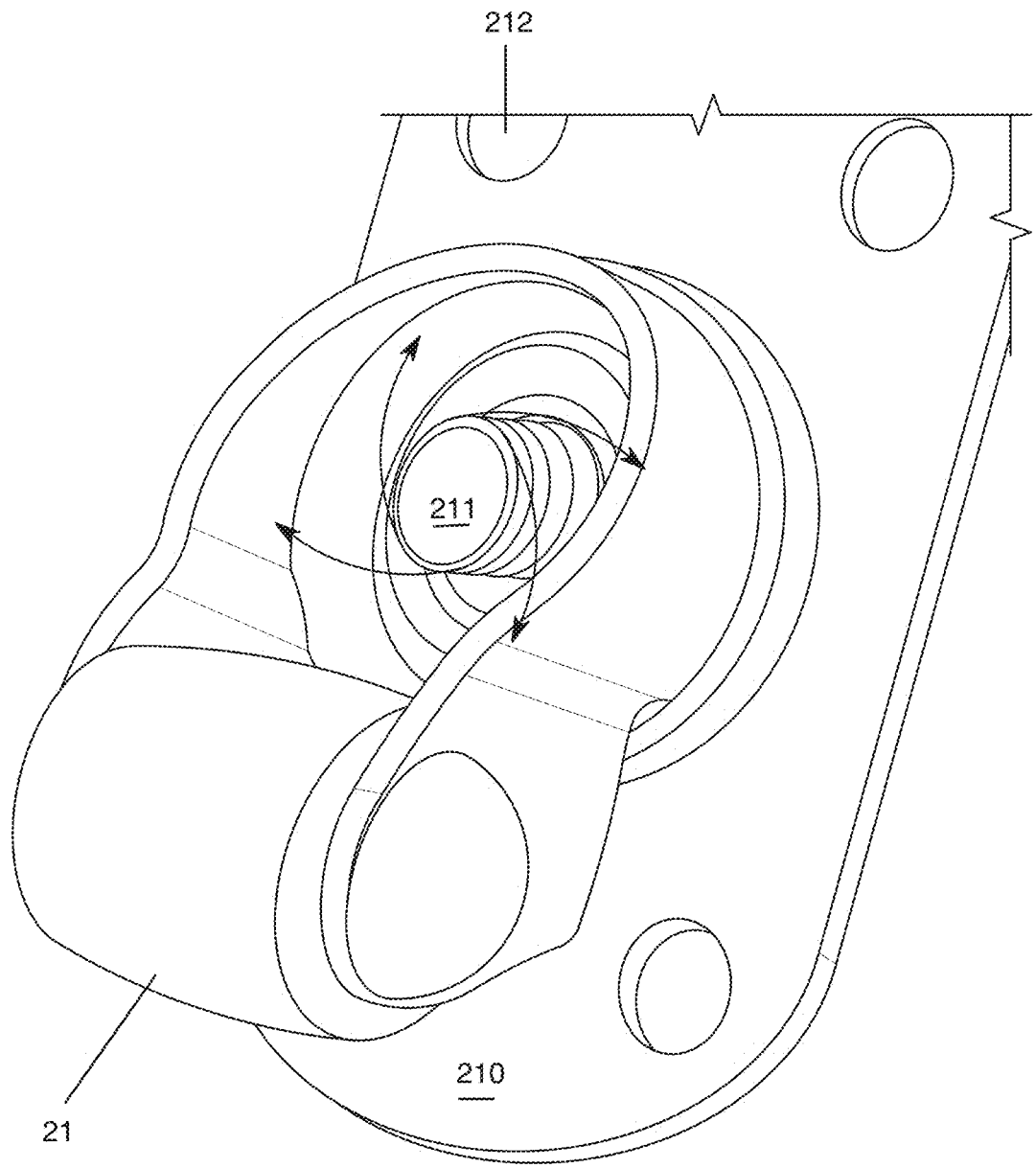
FIG. 14 is a detailed perspective view of an exemplary embodiment of an omnidirectional wheel 21 of the present invention, illustrating the 360-degree wheel functionality of the omnidirectional wheel 21, which in turn enables users to slide and glide the planar base 10 of the kitchen caddy is any direction along a supporting surface.
Figure 15:
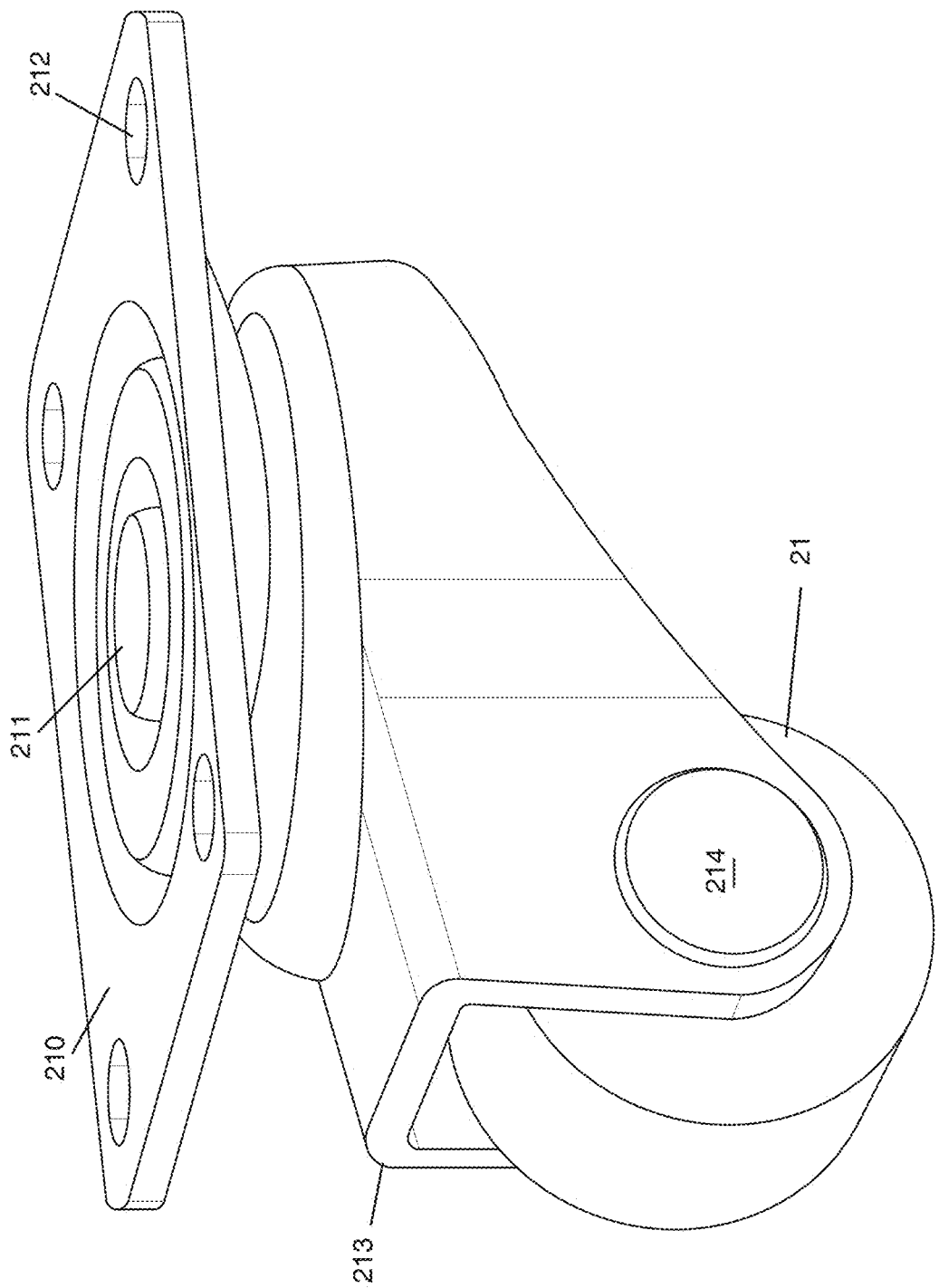
FIG. 15 is a detailed perspective view of an exemplary embodiment of the omnidirectional wheel 21 of the present invention.

Referring to FIGS. 14 through 16, the present invention may include an omnidirectional wheel 21 that provides a base plate 210 providing a pivot point 211 about which the omnidirectional wheel 21 can rotate 360-degrees. The base plate 210 may have fastener holes 212, though they are not required as long as the omnidirectional wheel 21 can be secure to the underside of the planar base 10 at the connection points 14, for instance through adhesives as opposed to fasteners, screws, or rivets. The connection points 14 may be recesses in said underside of the planar base 10, and thus if so, the base plates 210 are dimensioned and shaped to fit within the recesses.

The omnidirectional wheel 21 may have a bracket 213 that extends downward from the pivot point 211, and between the bracket 213 is an axle 214 about which the wheel component rotates 360-degrees. The omnidirectional wheel 21 may be swivel caster wheel, made of stainless steel or other functionally equivalent material. the base plate 210 may be made of A3 Carbon steel. In some embodiments, the base plate may be approximately 1.18 inches by 1.77 inches.

The wheel component may be Polypropylene and has a diameter of approximately 0.5 inches, and come in many colors, such as orange, white and black, it attaches to a metal pin/axle 214 to a steel frame/bracket 213 that swivels 360 degree. The base plate 210 secures to the bamboo board/planar base 10 either by nano 3m adhesive rubber foam or 4 screws. The omnidirectional wheel 21 may have a top to bottom height of approximately 0.78 inches.

The 360-degree swivel functionality of the omnidirectional wheel 21 enables movement any direction a user desires, while the high-quality steel base plate 210 ensures durability and stability.

Adhesively attached casters/omnidirectional wheel 21 can be a convenient solution in situations where permanent attachment of casters/omnidirectional wheel 21 is not possible or desirable. They can be useful for temporary use, in rental or leased spaces where permanent modifications are not allowed, for quick and easy installation without tools, and for versatile use on various surfaces. Self-adhesive casters/omnidirectional wheel 21 can add mobility without requiring special skills for installation.

The omnidirectional wheel 21 allows the appliance slider/kitchen caddy 10 to deliver a genuine 360-degree smooth movement experience-swift, quiet, and ready to effortlessly relocate your appliances with a simple, gentle pull whenever needed. The omnidirectional wheel 21 not only facilitates the effortless movement of kitchen appliances for easy organization but also adds a touch of natural beauty to your kitchen with its subtle, natural color. The omnidirectional wheels 21 ensure smooth movement without scratching your countertops. Rust-resistant for worry-free use, these wheels leave no marks.

It is understood that differently shaped planar bases may be used for differently shaped and sized appliances it may support.

A method of using the present invention may include the following. The kitchen caddy 100 disclosed above may be provided. A heavy kitchen appliance 28 to be stored in a confined space, such as a kitchen cabinet or cupboard, may be placed on the kitchen caddy 100 to facilitate ease of accessibility. For instance, the kitchen caddy 100 may support coffee machines, kitchen mixers, or any countertop appliance. Users would then be able to move around their appliance more easily via manipulating the finger grip slot 16 and thus the otherwise undriven omnidirectional wheels 20 along a supporting surface 26.

Additionally, the present invention can support a computer and computer accessories, like a speaker or monitor, to facilitate moving the computer and corresponding peripherals around a corporate office or a conference room for, say, a video conference.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A kitchen caddy comprising:
   a base having an operative surface and an opposing underside;
   a plurality of omnidirectional wheels connected to the underside so that the base is slidable in any direction along a supporting surface for the plurality of omnidirectional wheels, wherein the base has a thickness of less than three and a quarter centimeter to support kitchen equipment within a confined kitchen space, wherein each omnidirectional wheel is a swivel caster providing three-hundred and sixty degrees of rotation about a pivot point normal to a supporting surface on which the kitchen caddy rides; and
   voids in the underside for embedding portion of restraining fixtures.

2. The kitchen caddy of claim 1, wherein each swivel caster provides a base plate that connects directly to the underside of the base, and wherein the pivot point is downward of the base plate.

3. The kitchen caddy of claim 1, further comprising a movement stabilizer operatively associated with the underside, wherein the movement stabilizer is a foam element.

4. The kitchen caddy of claim 3, wherein the movement stabilizer is configured to reduce mobility.

5. The kitchen caddy of claim 1, further comprising a finger grip slot formed in the operative surface.

6. The kitchen caddy of claim 5, further comprising a finger grip insert embedded in the finger grip slot.

\* \* \* \* \*